(12) United States Patent
Takahashi et al.

(10) Patent No.: US 6,602,572 B2
(45) Date of Patent: Aug. 5, 2003

(54) MAGNETIC RECORDING MEDIA HAVING A SPECIFIC WIDTH RELATIONSHIP BETWEEN THE MAGNETIC COAT AND PRIMER COAT AND PRODUCING METHOD THEREOF

(75) Inventors: Shinsuke Takahashi, Odawara (JP); Yoshiro Kitsukawa, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 69 days.

(21) Appl. No.: 09/989,455

(22) Filed: Nov. 21, 2001

(65) Prior Publication Data

US 2002/0098385 A1 Jul. 25, 2002

(30) Foreign Application Priority Data

Nov. 27, 2000 (JP) .......................................... 2000-359531

(51) Int. Cl.$^7$ ............................... B32B 3/16; G11B 5/73
(52) U.S. Cl. ............. 428/77; 428/694 TB; 428/694 BB
(58) Field of Search .................... 428/694 TB, 694 BB, 428/77

(56) References Cited

U.S. PATENT DOCUMENTS

| | | | | |
|---|---|---|---|---|
| 4,982,687 A | * | 1/1991 | Takahashi et al. | |
| 5,011,714 A | * | 4/1991 | Takahashi et al. | |
| 5,202,164 A | * | 4/1993 | Takahashi et al. | |
| 5,209,954 A | * | 5/1993 | Takahashi et al. | |
| 5,275,842 A | * | 1/1994 | Takahashi et al. | |
| 5,614,023 A | * | 3/1997 | Takahashi et al. | |
| 5,888,637 A | * | 3/1999 | Kakuishi et al. | |
| 5,958,565 A | * | 9/1999 | Hattori et al. | |

FOREIGN PATENT DOCUMENTS

| | | |
|---|---|---|
| JP | 61-257268 B1 | 11/1986 |
| JP | 1-102736 B1 | 4/1989 |
| JP | 6-20271 B1 | 1/1994 |

* cited by examiner

*Primary Examiner*—H. Thi Le
(74) *Attorney, Agent, or Firm*—Sughrue Mion, PLLC

(57) ABSTRACT

A magnetic recording medium which enables not only getting rid of trouble due to scrapes occurring in a selvage portion of a web, but also preventing blocking trouble from occurring in heat treatment during post processing and a method of producing the same. A release coat is formed on a back surface of the web at least at portions in contact with overcoatedly primed portions so that the overcoatedly primed portions will not stick to the back surface of the web, whereby the overcoatedly primed portions can prevent scrapes from occurring in selvage portions of the web during the coating of the web with a magnetic fluid, in addition, the overcoatedly primed portions will not stick to the back surface of the web, due to the release coat, during the heat treatment of the magnetic recording medium produced into a roll, whereby blocking trouble can also be prevented from occurring.

3 Claims, 6 Drawing Sheets

F I G. 3
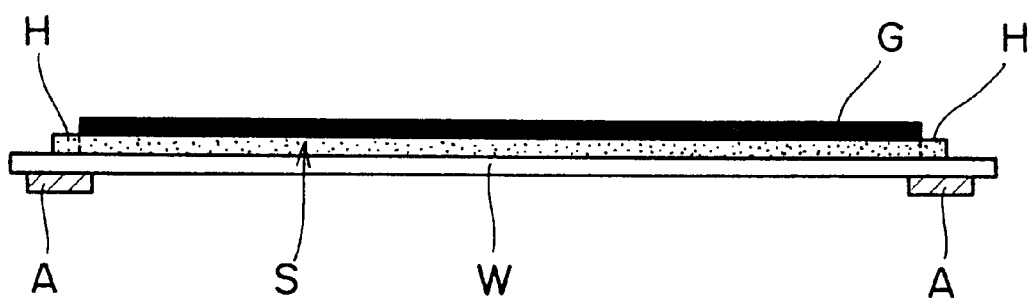

MAGNETIC RECORDING MEDIA HAVING A SPECIFIC WIDTH RELATIONSHIP BETWEEN THE MAGNETIC COAT AND PRIMER COAT AND PRODUCING METHOD THEREOF

BACKGROUND OF THE INVENTION

1. Field of the Invention

The present invention relates to magnetic recording media and a producing method thereof, in particular to a method of producing magnetic recording media which uses an extrusion coater to coat a continuously running flexible substrate (hereinafter referred to as "web") with a magnetic fluid and the magnetic recording media produced thereby.

2. Description of the Related Art

The production of magnetic recording media, such as magnetic disk and magnetic tape, have been carried out by coating a web with a certain magnetic fluid, and an extrusion coater has been often used in such production. This extrusion coater coats a continuously running web with a magnetic fluid by ejecting the magnetic fluid having been supplied to a coating head thereof to an edge surface of the coating head through slits formed in the edge surface, while relatively pressing the web and the edge surface of the coating head against each other. The coating width of the magnetic fluid applied on the web is regulated by coating width regulating plates fitted into the lateral edges of each slit. This allows uncoated portions, that is, portions coated with no magnetic fluid to be formed on the lateral edges of the web. This uncoated portion is what is known as web selvage portion which is to be cut off finally, therefore it does not need to be coated with the magnetic fluid.

In the extrusion coater, though a web and the edge surface of its coating head are spaced at a fixed distance apart because a coating fluid intervenes between them, contact occurs between the two at the aforementioned uncoated portions (hereinafter referred to as selvage portion) of the edges of the web, this may cause scrapes in the web. Occurrence of scrapes in the web leads to trouble with quality of the produced magnetic recording medium, such as drop-out, due to the powder of the scraping chips. In addition, the powder of the scraping chips accumulates on the edge surface of the coating head and pushes up the web, leading to trouble with coating, for example, too thick a coal; is applied to the web.

With the increase in recording density of the magnetic recording media and with the decrease in recording layer thickness of the same, there have been increasing demands in recent years that a thinner and uniform magnetic coat should be applied to a web at a higher speed, and at the same time, the web used is becoming thinner and more delicate. This in turn makes more serious the problems, such as trouble with coating, for example, too thick a coat resulting from scrapes caused in the web during coating operation and fracture of the web; as a result, there have been strong demands to take measures to deal with the scrapes in a web.

As the measures to prevent scrapes from occurring in a web, there are disclosed in Japanese Patent Application Publication Nos. 61-257268 and 1-102736 methods in which physical contact between the web and the edge surface of the coating head is prevented from occurring by coating the selvage portions of the web with a solvent before starting coating with an extrusion coater.

There is also disclosed in Japanese Patent Application Publication No. 6-20271 a method which is an improvement of the above prior art methods. The method prevents scrapes from occurring in a web with the aid of an overcoatedly primed portion (the portion of a primer coat showing on both sides of a magnetic coat) which is formed by applying a primer fluid to the web, prior to applying a magnetic fluid thereto, in such a manner as to allow the primer coat formed to be wider than the magnetic coat subsequently formed. The overcoatedly primed portion which is to remain on the surface of the web in the exposed state, however, gives rise to a new problem during the post processing after a roll of the magnetic recording medium has been produced, because the primer coat is intended to increase the adhesion between the magnetic coat and the web, and therefore, it has tackiness. In particular, the magnetic recording medium is subjected to heat treatment in such a state that it is wound up into a roll so as to set the coat having been applied thereto and remove the thermal stress from the same. This causes the overcoatedly primed portion to be softened and stick to the back surface of the web, resulting in occurrence of sticking trouble, commonly known as blocking trouble, such that the coat in the neighborhood of the web selvage portion is stripped when unwinding the roll. The expansion of the stripped portion caused by the blocking trouble then causes trouble with recording medium quality, such as drop-out. As the measures to cope with this problem, in the coating method disclosed in Japanese Patent Application Publication No. 6-20271, Tg (glass transition temperature) of the primer fluid applied to the overcoatedly primed portion is raised so that it will not be softened by the heat treatment.

The coating method disclosed in Japanese Patent Application Publication No. 6-20271 has the following disadvantages, while it is an excellent method.

Specifically, as the level of demands for dimensional stability of magnetic recording media becomes higher with the increase in recording density of the magnetic recording media in recent years, it becomes necessary that the heat treatment described above be carried out at a higher temperature for a longer period of time. As a result, even with the primer fluid of which Tg has been raised, blocking may occur during the heat treatment; accordingly, raising Tg of the primer fluid is not a basic solution. Further, raising Tg of the primer fluid means that the kinds of primer fluids applicable are limited, which leads to an extreme decline in degree of freedom of selecting a primer fluid.

SUMMARY OF THE INVENTION

The present invention has been developed in view of the above-described circumstances, and has as its object the provision of a magnetic recording medium which enables not only getting rid of trouble due to scrapes occurring in the selvage portion of a web, but also preventing blocking trouble from occurring in heat treatment during post processing and a method of producing the same.

In order to attain the above-described object, the present invention is directed to a coating process in which a magnetic coat is formed by coating a continuously running web with a magnetic fluid ejected to the edge surface of a coating head through slits of the same, leaving the lateral edges of the web uncoated, while relatively pressing the surface of the web and the edge surface of the coating head against each other and a primer coat is formed on the web prior to forming the above magnetic coat on the same, and the process is characterized in that overcoatedly primed portions are formed on both sides of the above magnetic coat in such a manner that the primer coat becomes wider than the magnetic coat and a release coat is formed on the back surface of the web at least at the portions corresponding to the above overcoatedly primed portions.

Further, in order to attain the above-described object, the present invention is directed to a magnetic recording medium, comprising: a web; a magnetic coat formed on a surface of the web; a primer coat formed on the surface of the web prior to forming the magnetic coat on the surface of the web and having overcoatedly primed portions which are formed on both sides of the magnetic coat in such a manner that the primer coat becomes wider than the magnetic coat; and a release coat formed on a back surface of the web at least at the portions corresponding to the overcoatedly primed portions.

According to the present invention, a release coat is formed on the back surface of the web at least at the portions in contact with overcoatedly primed portions so that the overcoatedly primed portions will not stick to the back surface of the web, whereby the overcoatedly primed portions can prevent scrapes from occurring in the selvage portions of the web during the coating of the web with a magnetic fluid, in addition, the overcoatedly primed portions will not stick to the back surface of the web, due to the release coat, during the post processing after a roll of the magnetic recording medium is produced, for example, during the heat treatment of the web in the roll on which the above-described coats are applied, whereby blocking trouble can be prevented from occurring. Moreover, according to the present invention, it is not necessary to raise Tg of the primer fluid for use in forming a primer coat, whereby the kinds of primer fluids applicable are not limited.

BRIEF DESCRIPTION OF THE DRAWINGS

The nature of the present invention, as well as other objects and advantages thereof, will be explained in the following with reference to the accompanying drawings, in which like reference characters designate the same or similar parts throughout the figures and wherein:

FIG. 3 is a cross sectional view of a magnetic recording medium according to an embodiment of the present invention;

DETAILED DESCRIPTION OF THE PREFERRED EMBODIMENTS

Hereunder a preferred embodiment will be described in detail for a magnetic recording medium of the present invention and a method of producing the same in accordance with the accompanied drawings.

Figure 1:
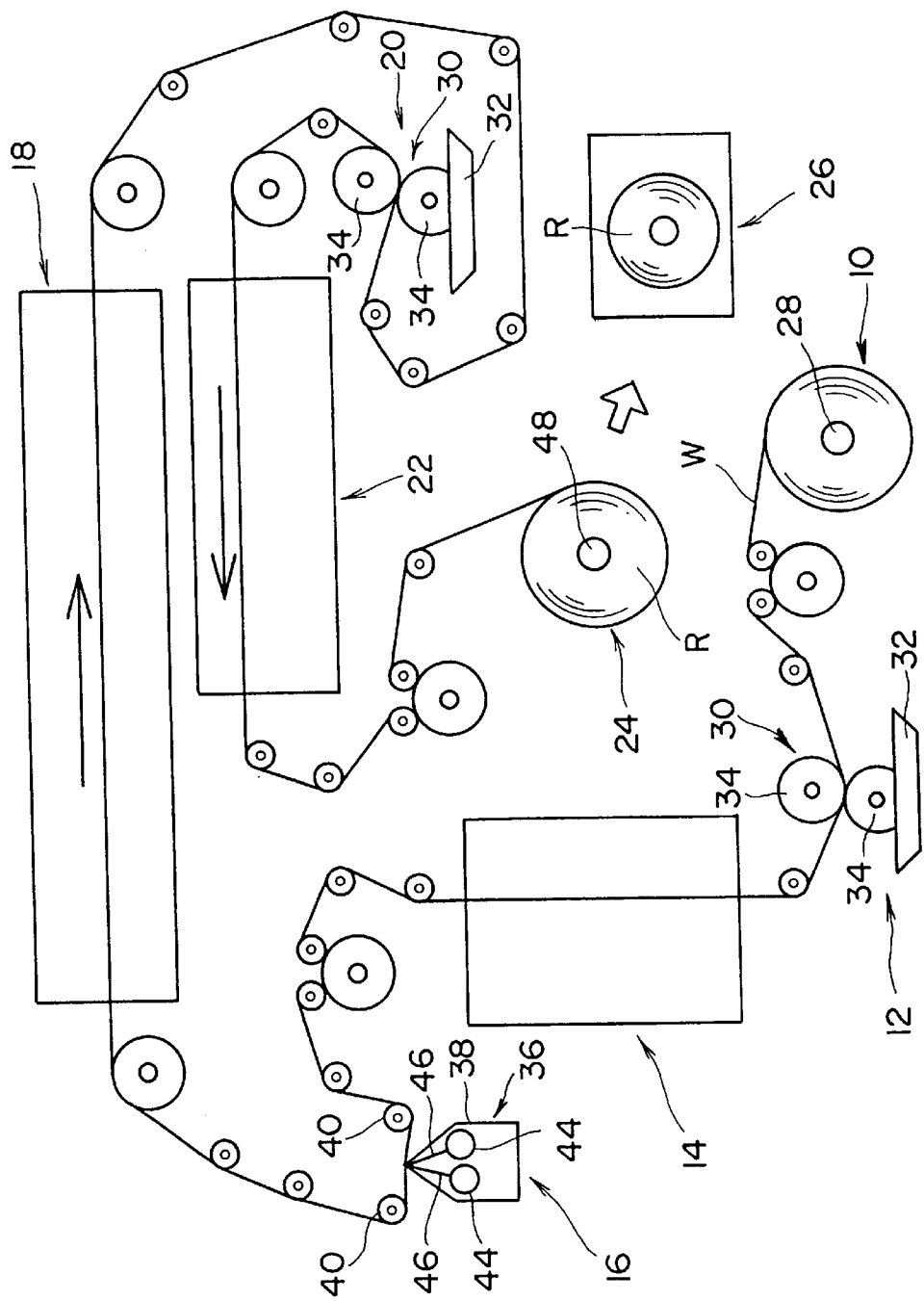
FIG. 1 is a flow sheet illustrating a method of producing a magnetic recording medium according to an embodiment of the present invention.

Referring to FIG. 1, there is shown a flow sheet illustrating a method of producing a magnetic recording medium according to an embodiment of the present invention.

As shown in FIG. 1, the production method of the embodiment includes a lead-out step 10, a primer fluid coating step 12, a primer coat drying step 14, a magnetic fluid coating step 16, a magnetic coat drying step 18, a release fluid coating step 20, a release coat drying step 22, and a take-up step 24. And in the magnetic recording medium R produced in a roll in the above steps, setting of the applied coats and removing of thermal stress are carried out in a heat treatment step 26.

Figure 2:
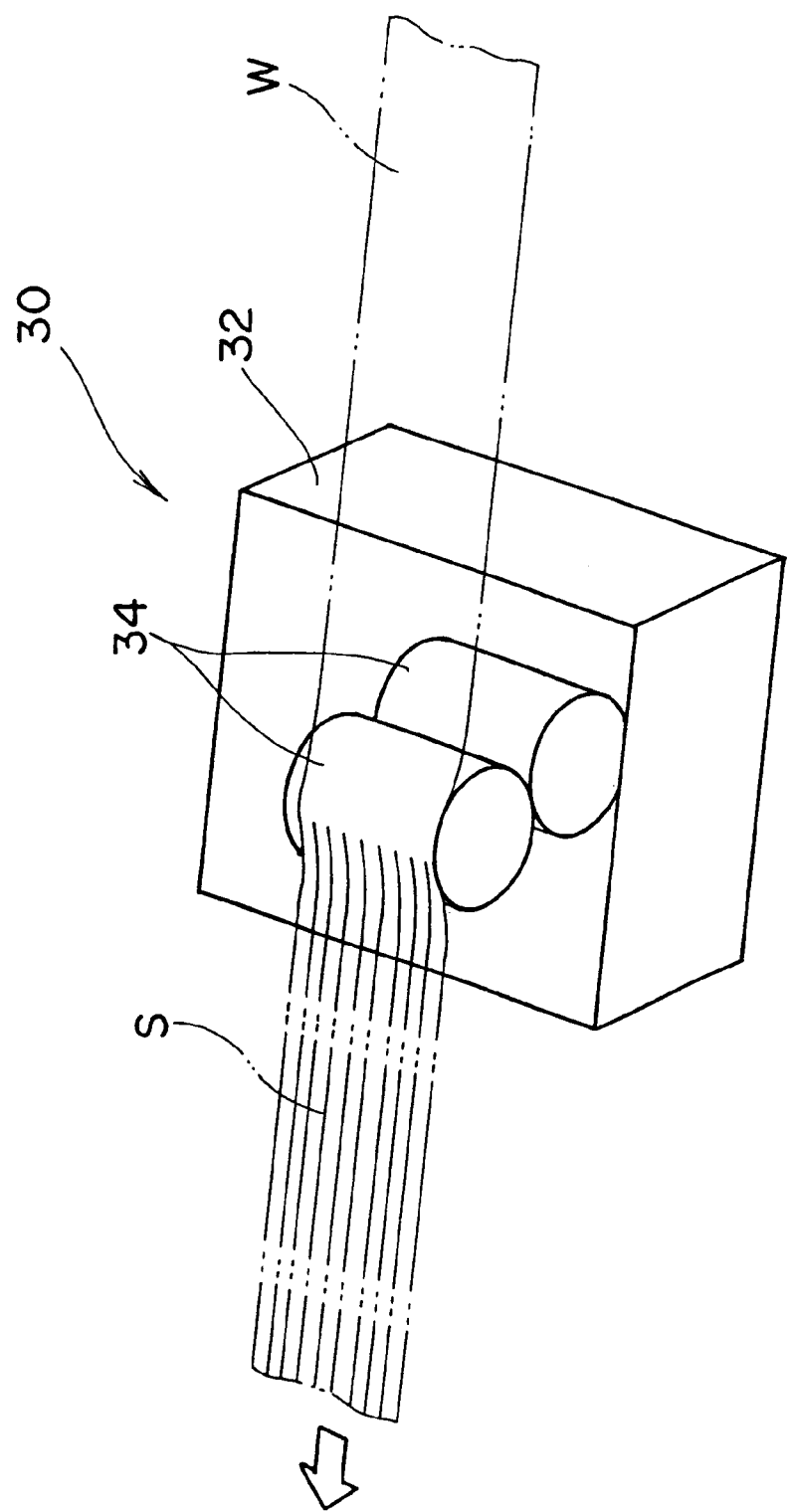
FIG. 2 is a view illustrating one example of coaters for forming a primer coat.

As shown in FIG. 1, a web W wound around a lead-out reel 28 in the lead-out step 10 is led out to the primer fluid coating step 12 in which the surface of the web W (the same surface as that to be coated with a magnetic fluid) is coated with a primer fluid. Thus a primer coat S (refer to FIG. 2) is formed. A coater 30 for primer coating is not limited to any specific ones, but for example, a pan/roller coater as shown in FIG. 2 can be suitably used which includes a coating fluid pan 32 for storing a coating fluid and upper and lower reverse rollers 34, 34 with almost the same length as the width of the web W. At the time of rotating the reverse rollers 34, 34, the primer fluid stored in the coating fluid pan 32 is transferred and applied to the web W. The application of the primer fluid is carried out in such a manner that the width of a primer coat S formed becomes larger than that of each slit (corresponding to the width of a magnetic coat) of an extrusion coater used in the magnetic fluid coating step 16 described later.

Then, the web W is dried in the primer coat drying step 14. The dryer used is not limited to any specific ones; however, an atmospheric drier, which dries the primer coat S of the web W conveyed by the rollers in the warm atmosphere while supplying warm air into its tunnel-shaped body, or a PAC type drier, which conveys and dries the web W in a non-contact manner by providing its tunnel-shaped body with more than one air header blowing dry air toward the upper and lower sides of the conveying line of the web W and exposing the web W to warm blown air from the headers, can be suitable used.

The web W on which the primer coat S has already been formed is further coated with a magnetic fluid by an extrusion coater 36 in the magnetic fluid coating step 16. Thus a magnetic coat G is formed. The number of the magnetic coats is not limited to one, and more than one type of magnetic fluid may be applied one on top of another. This magnetic coat G is applied in such a manner that the width thereof becomes smaller than that of the primer coat S, as shown in FIG. 3. As a result, overcoatedly primed portions H (refer to FIG. 3) which show on both sides of the magnetic coat G are formed.

Figure 4:
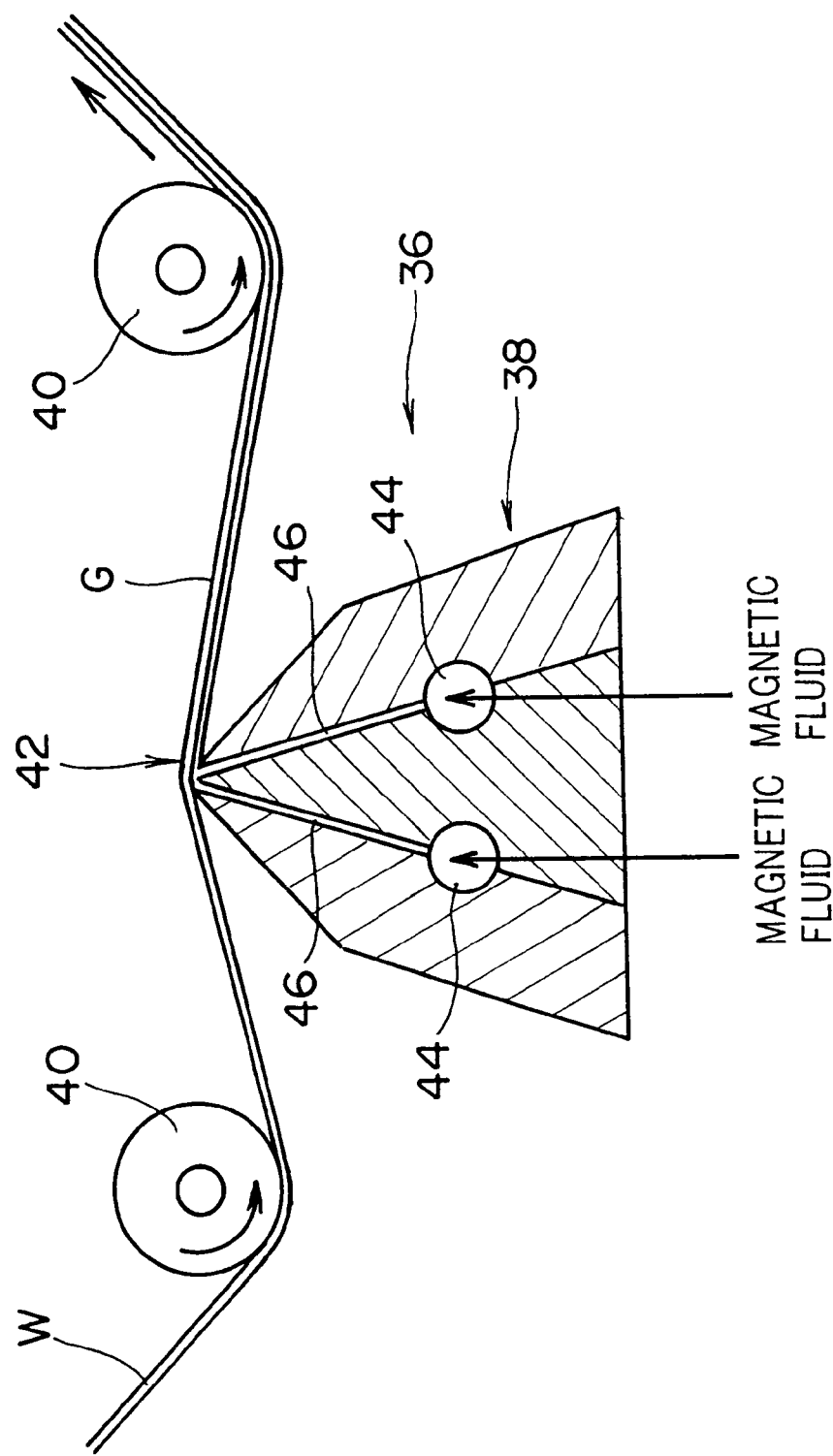
FIG. 4 is a cross sectional view illustrating an extrusion coater.

The extrusion coater 36 comprises: a coating head 38; and a pair of guide rollers 40, 40 which are provided, respectively, on the upstream and downstream sides relative to the web W running direction in such a manner as to face each other across the coating head 38 and guide the continuously running web W in the fixed direction, as shown in FIG. 4. The coater 36 coats the continuously running web W with a magnetic fluid having been supplied to pocket portions 44 by ejecting the same to an edge surface 42 of the coating head 38 through slits 46 while relatively pressing the web and the edge surface 42 against each other. The coating width of the magnetic fluid applied on the web is regulated by coating width regulating plates (not shown in the drawing) fitted into the lateral edges of each slit 46.

The web is then dried in the magnetic coat drying step 18. The drier used is not limited to any specific ones, and the same drier as that used in the primer coat drying step 14 can be used.

Figure 5:
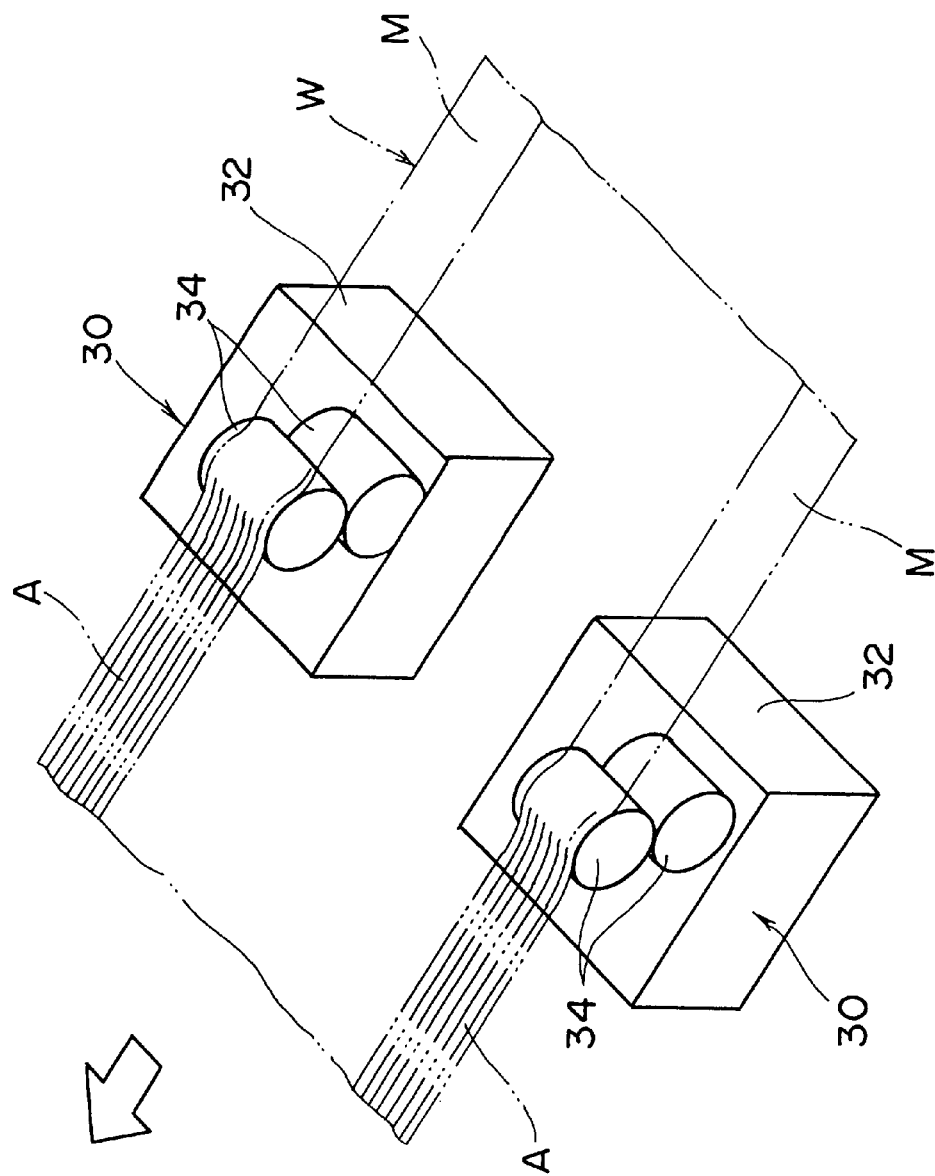
FIG. 5 is a view illustrating one example of coaters for forming a release coat.
Figure 6:
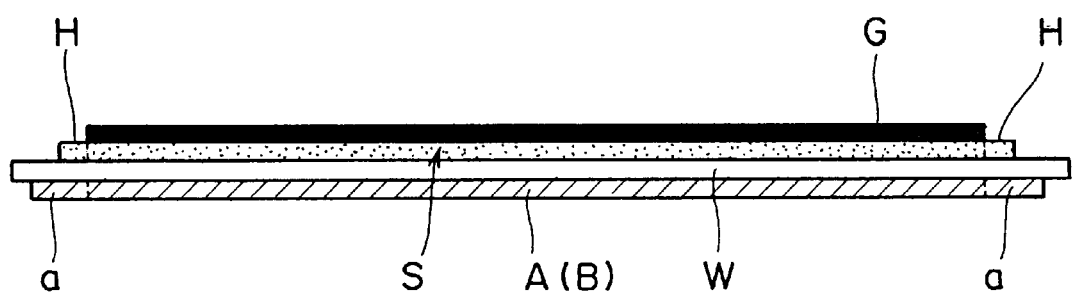
FIG. 6 is a cross sectional view of a magnetic recording medium according to an embodiment of the present invention in which a back coat also serves as a release coat.

Then, the back surface of the web W is coated with a release fluid at least at the portions corresponding to the overcoatedly primed portions H in release fluid coating step 20. The coater for use in coating the release fluid is not limited to any specific ones, and as shown in FIG. 5, a pair of coaters each having the same structure as that of the pan/roller coater used in the primer fluid coating step 12, but having shorter rollers are suitably used in such a manner that they are placed at the selvage portions M on the lateral edges of the web W. At the time of rotating the reverse rollers 34, the release fluid stored in the coating fluid pan 32 is applied to the selvage portions M on the back surface of the web W and release coats A are formed on the back surface of the web at least at the portions corresponding to the overcoatedly primed portions H (refer to FIG. 3). The manner in which release coats A are formed is not limited to the above described one, in which two separate release coats A are formed at the lateral edge portions on the back surface of the web W, but as shown in FIG. 6, a single continuous and wide release coat may be formed on the back surface of the web, as long as the portion on which the release coat is formed includes the portion corresponding to the overcoatedly primed portions H. Accordingly, in a magnetic recording medium provided with a back coat B, if the back coat B is formed by applying a back coat fluid to the back surface of the web W as far as the portions corresponding to the overcoatedly primed portions H, the edge portions of the back coat B, in other words, the portions corresponding to the overcoatedly primed portions H (denoted by a in FIG. 6) can also be used as the release coat A. This is due to the release characteristics of the back coat B which is not a smooth surface but a rough one because the back coat fluid is a pigment dispersion system. The back coat B has been provided on the back surface of the magnetic coat G so as to ensure the running performance and running endurance of a tape while writing and reading; therefore, there has been no sense in applying the back coat B wider than the magnetic coat G, and doing so has only resulted in higher costs. And unlike the present embodiment, the back coat has never been formed as far as the portions corresponding to the overcoatedly primed portions H (denoted by a in FIG. 6) in the prior art. In this case, a pair of pan/roller coaters of which rollers are relatively short cannot be used, but the pan/roller coater used in the primer fluid coating step 12, of which rollers are long, can be used.

The web W is then dried in the release coat drying step 22 and wound up into a roll by a take-up reel 48 in the take-up step 24. Thus a magnetic recording medium R is produced. The drier used is not limited to any specific ones, and the same drier as that used in the primer coat drying step 14 and in the magnetic coat drying step 18 can be suitably used.

The magnetic recording medium R produced in the above-described manner is led to the heat treatment step 26 and heat treated while remaining rolled, whereby to set the coat having been applied thereto and remove the thermal stress from the same. The heat treating apparatus used is not limited to any specific ones, but the above-described PAC type one is preferably used.

In the method of producing a magnetic recording medium R which includes the steps described above, according to the present invention, in the primer fluid coating step 12, a primer coat S is formed in such a manner that it becomes wider than the magnetic coat G and overcoatedly primed portions H are formed on both sides of the magnetic coat G. The overcoatedly primed portions H enable the prevention of scrapes from occurring in the selvage portions of the web when coating the primer coat S with a magnetic fluid by an extrusion coater in the magnetic fluid coating step 16.

Further, in the release fluid coating step 20, a release coat A is formed by coating the back surface of the web W at least at the portions corresponding to the overcoatedly primed portions H with a release fluid. This release coat A prevents the overcoatedly primed portions H from sticking to the back surface of the web W, even if the overcoatedly primed portions H is softened by heat and exhibits tackiness when heal treating the web W wound into a roll in the heat treatment step after a magnetic recording medium R has been produced. This means that trouble with adhesion what is known as blocking trouble, such that the coat in the neighborhood of the selvage portions M of a web is stripped when rewinding a roll of wave, does not occur.

Accordingly, the present invention enables getting rid of blocking trouble, which is a disadvantage of the overcoatedly primed portions H, while making use of the advantage of the overcoatedly primed portions H that they can effectively prevent scrapes from occurring in the selvage portions M of a web.

Further, unlike the prior art, the present invention does not require that Tg of the primer fluid be raised, as measures to deal with blocking trouble caused by the overcoatedly primed portions H, whereby the kinds of primer fluids applicable are not limited. Accordingly, the present invention can deal with any kinds of primer coats S.

The present invention is very useful especially in the production of magnetic recording media; however, it is to be understood that the present invention is applicable to the production of articles other than magnetic recording media, as long as the production method includes a coating process using an extrusion coater.

EXAMPLE

In the following, the results of examining the presence of scrapes in the web and that of blocking failure will be described in terms of the example which satisfies the conditions of the present invention and the comparative examples which do not satisfy the conditions of the same.

The web, primer coat, magnetic coat and back coat used in the examination were as follows:

(1) Web: PEN (polyethylene naphthalate) of 6 $\mu$m thick and 550 mm wide
(2) Primer coat: A primer fluid of 1 part by weight of binder, 200 parts by weight of methyl ethyl ketone and 800 parts by weight of cyclohexanone was applied to the web to give a prime coat 2 cc/m$^2$ thick.
(3) Magnetic coat: Coating fluid 1 and coating fluid 2 having the compositions shown in Tables 1 and 2, respectively, were applied on top of one another to give dried magnetic coats 1.2 $\mu$m thick and 0.2 $\mu$m, respectively.
(4) Back coat: A back coat stock solution having the composition shown in Table 3 was applied to give a dried back coat 0.5 $\mu$m thick.

TABLE 1

| Composition of Coating Fluid 1 | Parts by weight |
|---|---|
| Inorganic Powder | |
| Composition: TiO$_2$ | 100 parts |
| Average Diameter of Primary Particles 0.05 $\mu$m | |
| BET Specific Surface Area 18 m$^2$/g | |
| Carbon Black | 20 parts |
| (Average Diameter of Primary Particles 0.018 $\mu$m) | |
| Vinyl Chloride - Vinyl Acetate - Vinyl Alcohol Copolymer | 12 parts |
| Polyester Polyurethane Resin | 5 parts |
| Butyl Stearate | 1 part |
| Stearic Acid | 1 part |
| Methyl Ethyl Ketone | 200 parts |

TABLE 2

| Composition of Coating Fluid 2 | Parts by weight |
|---|---|
| Fine Particles of Ferromagnetic Metal | |
| Composition: Fe/Zn/Ni = 92/4/4 | 100 parts |
| He 2000 Oe | |
| BET Specific Surface Area 58 m$^2$/g | |
| Acicular Powder Rate 5.0 | |
| Vinyl Chloride - Vinyl Acetate Copolymer | 12 parts |
| (Polymerization Degree 300) | |
| Polyester Polyurethane Resin | 3 parts |

TABLE 2-continued

| Composition of Coating Fluid 2 | Parts by weight |
| --- | --- |
| α Alumina (Particle Size 0.5 μm) | 1 part |
| Carbon Black (Particle Size 0.1 μm) | 1.5 parts |
| Butyl Stearate | 0.5 parts |
| Stearic Acid | 1 part |
| Methyl Ethyl Ketone | 200 parts |

TABLE 3

| Back Coat Stock Solution | Parts by weight |
| --- | --- |
| Carbon Black | |
| S BET 220 m²/g | 100 parts |
| Average Particle Diameter 17 μm | |
| Nitrocellulose | 100 parts |
| RS1/2 | |
| Polyester Polyurethane | 30 parts |
| Dispersant | |
| Copper Oleate | 10 parts |
| Copper Phthalocyanine | 10 parts |
| Barium Sulfate (tend to set out) | 5 parts |
| Methyl Ethyl Ketone | 500 parts |
| Toluene | 500 parts |

A back coat fluid was prepared by first kneading/dispersing the above stock solution and then creating a dispersion system of: 100 parts by weight of the above stock solution; 100 parts by weight of carbon black (S BET 220 m²/g, average particle diameter 200 μm); and 0.1 parts by weight of α Alumina (Al$_2$O$_3$: average particle diameter 0.2 μm).

Table 4 shows the lateral lengths of the web, primer coat, magnetic coat and back coat of the example, comparative example 1 and comparative example 2.

TABLE 4

| | Example | Comparative Example 1 | Comparative Example 2 |
| --- | --- | --- | --- |
| Web | 550 mm | 550 mm | 550 mm |
| Primer Coat | 535 mm | 525 mm | 535 mm |
| Magnetic Coat | 530 mm | 530 mm | 530 mm |
| Back Coat | 540 mm | 530 mm | 530 mm |

Specifically, in the example, the primer coat is wider than the magnetic coat and the back coat is wider than the primer coat, which satisfies the conditions of the present invention.

In the comparative example 1, the back coat is wider than the primer coat, but the primer coat is narrower than the magnetic coat; in other words, the relationship between the primer coat and the magnetic coat does not satisfy the conditions of the present invention.

In the comparative example 2, the primer coat is wider than the magnetic coat, but the back coat is narrower than the primer coat; in other words, the relationship between the primer coat and the back coat does not satisfy the conditions of the present invention.

Evaluation was carried out in terms of the following two points:

(1) whether or not scrapes occur in the web during the coating by the extrusion coater; and (2) whether or not blocking trouble occurs when unwinding the magnetic recording medium wound around a take-up reel in a roll after subjecting the same to heat treatment under the circumstance of 70° C. for 48 hours by the heat treatment apparatus used in the heat treatment step.

(3) Overall evaluation was made based on the points (1) and (2). The results are shown in Table 5.

TABLE 5

| | Example | Comparative Example 1 | Comparative Example 2 |
| --- | --- | --- | --- |
| During Coating | No scrapes occurred | Scrapes occurred and there is a rise due to powder of scraping chips at the edge portions of the web | No scrapes occurred |
| Blocking Trouble | Not occurred | Not occurred | Occurred |
| Overall Evaluation | Excellent | Poor | Poor |

As apparent from Table 5, in the comparative example 1 in which the relationship between the primer coat and the magnetic coat does not satisfy the conditions of the present invention, scrapes occurred. And in the comparative example 2 in which the relationship between the primer coat and the back coat does not satisfy the conditions of the present invention, blocking trouble occurred. And both comparative examples were unacceptable.

On the other hand, in the example which satisfies the conditions of the present invention, neither scrapes in the web nor blocking trouble occurred. Accordingly, the example was acceptable.

As described so far, according to the magnetic recording medium and the method of producing the same of the present invention, trouble due to scrapes occurring in the selvage portion of a web can be gotten rid of, and moreover, blocking trouble in heat treatment during post processing can be prevented from occurring.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of producing a magnetic recording medium, comprising a coating process in which a magnetic coat is formed by coating a surface of a continuously running web with a magnetic fluid ejected to an edge surface of a coating head through slits thereof, leaving edges in a width direction of the surface of the web uncoated, while relatively pressing the surface of the web and the edge surface of the coating head against each other and a primer coat is formed on the surface of the web prior to forming the magnetic coat on the surface of the web, wherein overcoatedly primed portions are formed on both sides of the magnetic coat in such a manner that the primer coat becomes wider than the magnetic coat and a release coat is formed on a back surface of the web at least at portions corresponding to the overcoatedly primed portions.

2. The method of producing magnetic recording media according to claim 1, wherein a back coat is formed on the back surface of the web as far as the portions corresponding to the overcoatedly primed portions, the edge portions of the back coat being also used as the release coat.

3. A magnetic recording medium, comprising:

a web;

a magnetic coat formed on a surface of the web;

a primer coat formed on the surface of the web prior to forming the magnetic coat on the surface of the web and having overcoatedly primed portions which are formed on both sides of the magnetic coat in such a manner that the primer coat becomes wider than the magnetic coat; and a release coat formed on a back surface of the web at least at the portions corresponding to the overcoatedly primed portions.

* * * * *